United States Patent [19]

Marchewka et al.

[11] Patent Number: 4,953,409
[45] Date of Patent: Sep. 4, 1990

[54] NOISE AND OFFSET VOLTAGE-COMPENSATED ELECTROMAGNETIC FLOWMETER

[75] Inventors: Werner Marchewka, Neu-Eichenberg; Karl-Heinz Rackebrandt, Adelbsen; Klaus Schäfer, Hann-Münden; Albert Seebode, Rosdorf, all of Fed. Rep. of Germany

[73] Assignee: Fischer & Porter Company, Warminster, Pa.

[21] Appl. No.: 401,318

[22] Filed: Aug. 31, 1989

[51] Int. Cl.$^5$ ............................................... G01F 1/60
[52] U.S. Cl. ................................................ 73/861.17
[58] Field of Search ............ 73/861.17, 861.16, 861.12, 73/3; 361/152, 154

[56] References Cited

U.S. PATENT DOCUMENTS 4,704,908 11/1987 Blatter ............................. 73/861.17

Primary Examiner—Donald O. Woodiel
Attorney, Agent, or Firm—Michael Ebert

[57] ABSTRACT

An electromagnetic flowmeter whose primary includes a flow tube through which the fluid to be metered is conducted to intersect a magnetic field and thereby induce a voltage therein that is transferred to electrodes to produce an electrode signal as a function of flow rate, which signal includes a noise voltage. The electrode signal is applied to the input amplifier of a secondary whose output is fed to one input of a summing stage, the output of which is fed to a range amplifier that yields a test voltage, the input and range amplifiers producing offset voltages. To compensate for the noise and offset voltages, a compensation voltage is derived from the test voltage and applied to the other input of the summing stage. This compensation voltage is produced only when the test voltage exceeds a predetermined threshold value.

7 Claims, 3 Drawing Sheets

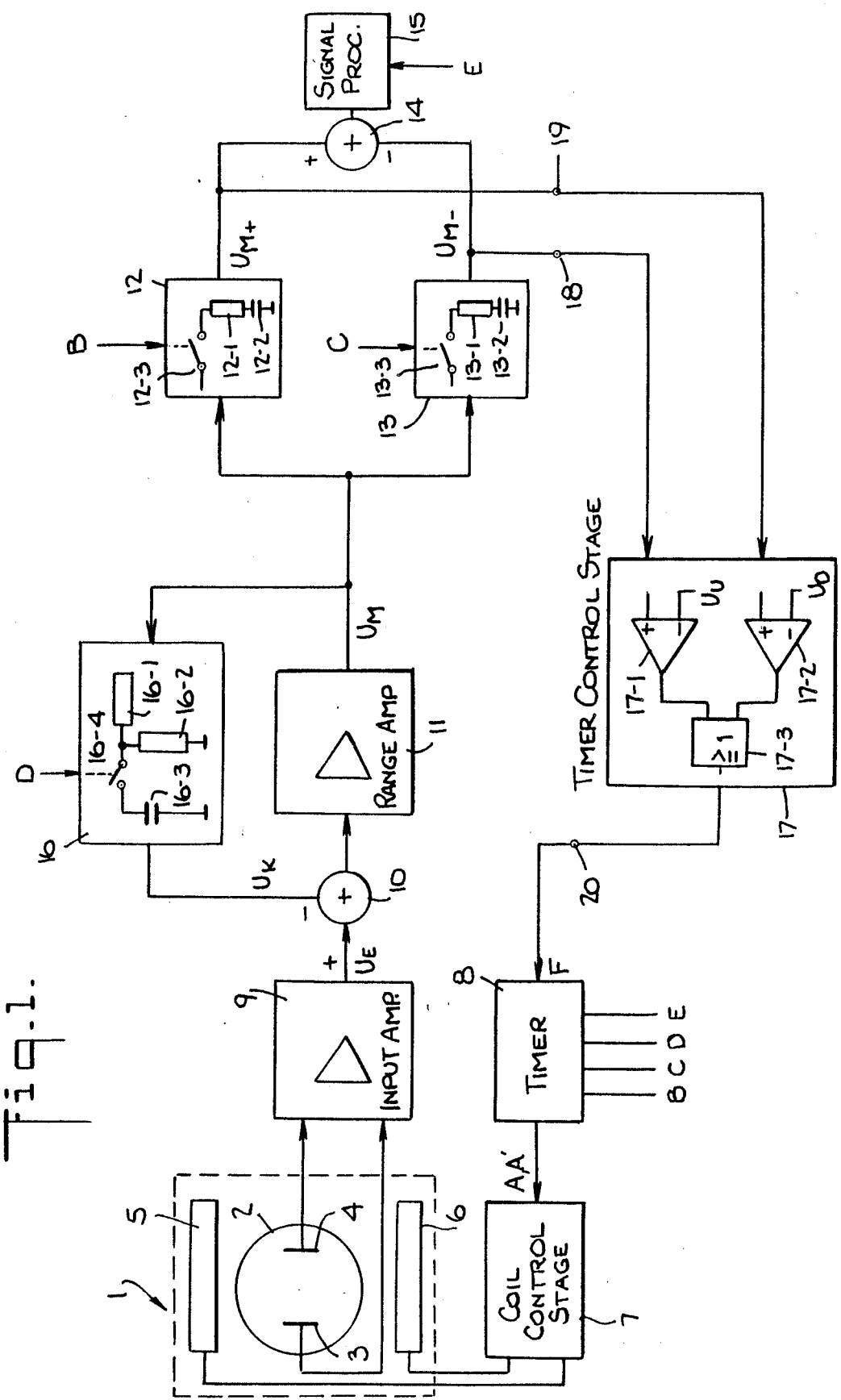

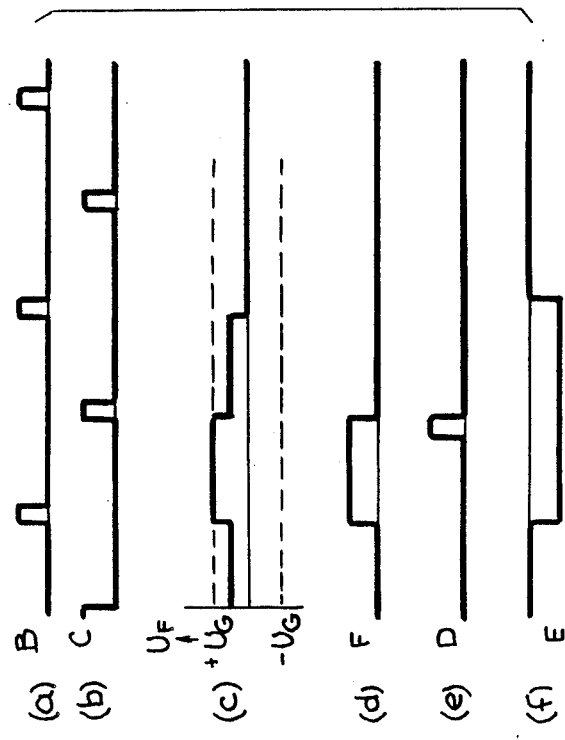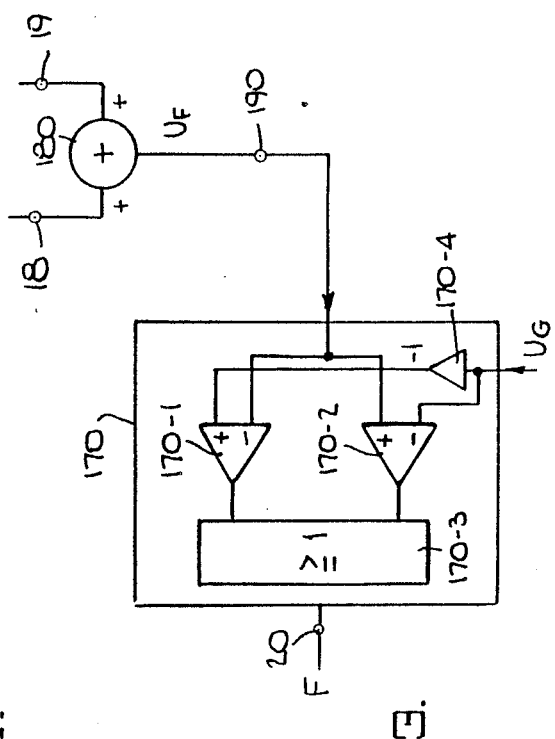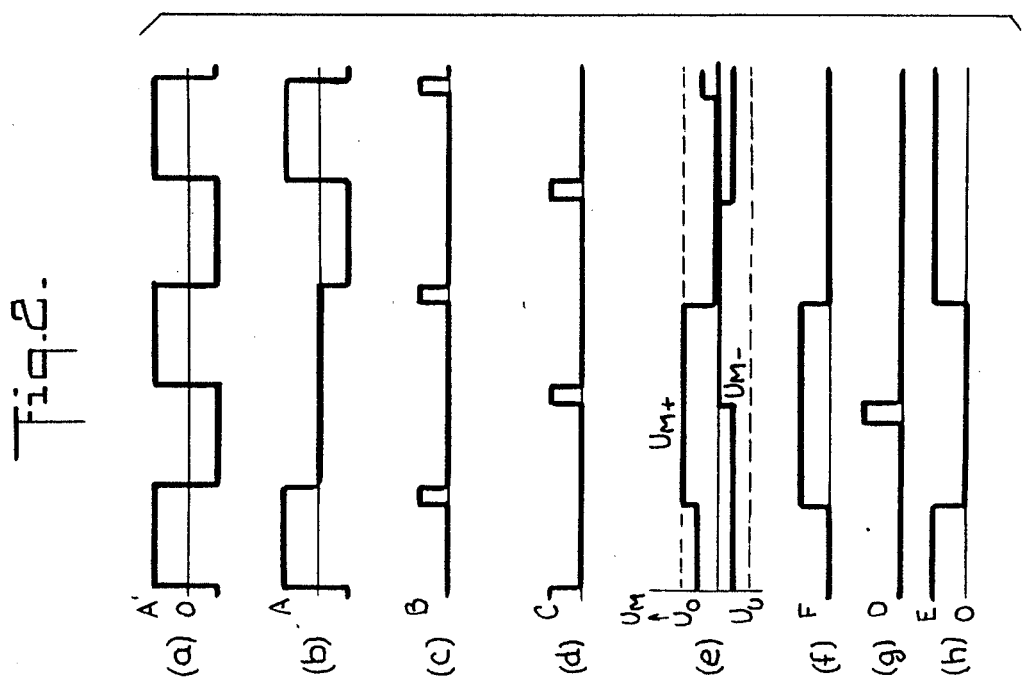

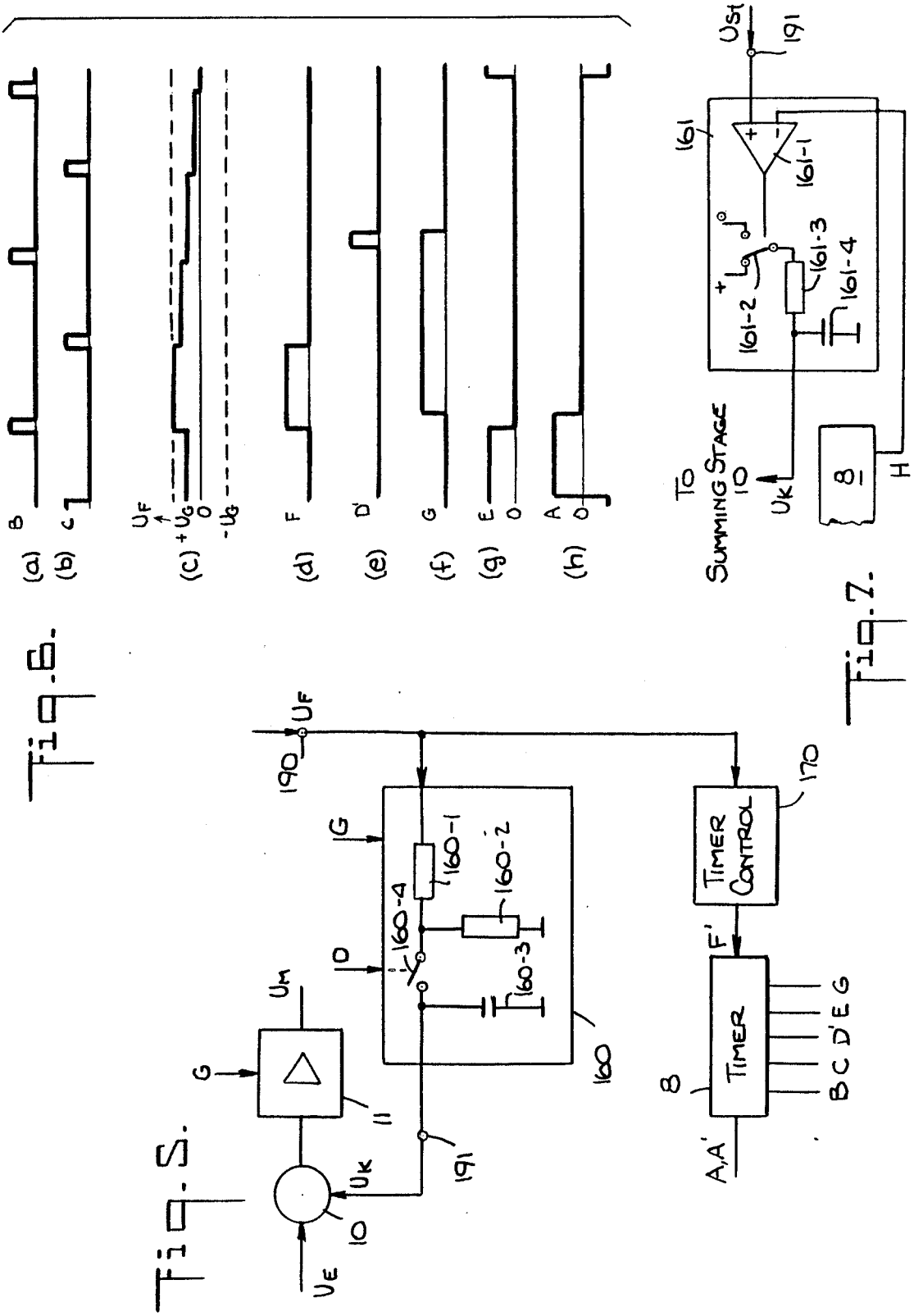

NOISE AND OFFSET VOLTAGE-COMPENSATED ELECTROMAGNETIC FLOWMETER

BACKGROUND OF INVENTION

1. Field of Invention:

This invention relates generally to electromagnetic flowmeters, and more particularly to a meter of this type in which a noise voltage generated in the primary of the meter and offset voltages produced in amplifiers included in the secondary and compensated for to provide an accurate flow rate reading.

2. Status of Prior Art:

In an electromagnetic flowmeter such as disclosed in the U.S. Pat. No. to Mannherz, 4,296,636, the liquid whose flow rate is to be measured is conducted through a flow tube of a primary provided with a pair of diametrically-opposed electrodes, a magnetic field perpendicular to the longitudinal axis of the tube being established by an electromagnet. When the flowing liquid intersects this field, a voltage is induced therein which is transferred to the electrodes. The voltage, which is proportional to the average velocity of the liquid and hence to its average volumetric rate, is then amplified and processed in a secondary to actuate a recorder or indicator.

German patent publication DE-05-3132471 discloses an electromagnetic flowmeter in which the signal from the primary is applied to a secondary that includes an input amplifier and a range amplifier whose amplified output is fed to sample and hold stages to yield two half-cycle sampling or scanning values which are fed to a signal processor.

Because the electrode signal voltage from the primary includes a noise voltage and the amplifiers in the secondary produce offset voltages, unless these voltages are compensated for, the flow rate reading is inaccurate. In the German publication, a compensating voltage is derived from the output of the range amplifier, and this is added to the output voltage from the input amplifier applied to the input of the range amplifier by way of a sample and hold stage activated by a timing signal derived from the half cycle scanning values.

In this prior arrangement, the sample and hold stage for producing the compensatory voltage is activated by the timing signal once every half cycle of the signal voltage; that is to say, in each half cycle of the signal voltage a scanning takes place of the compensating voltage. Thus each half cycle scanning value is free of noise voltages as long as these are constant during one period of the signal voltage.

One significant disadvantage of this prior arrangement is that not only is a period necessary for scanning the signal, but there must also be a signal available for compensation.

SUMMARY OF INVENTION

In view of the foregoing, the main object of this invention is to provide a flowmeter in which the noise voltage generated in the primary of the meter and offset voltages produced in amplifiers included in the secondary are compensated for to provide an accurate flow rate reading.

An important distinction between the present invention and the compensation arrangement disclosed in the prior German publication is that compensation of noise and offset voltages takes place only when these voltages lead to an overload of the amplifier stages of the signal processing system included in the secondary of the flowmeter and therefore to an erroneous signal processing. Existing noise and offset voltages that do not require compensation are determined within the signal processing system and eliminated. In this way, except for signal scanning, no further scanning interval within a signal measuring period is called for if compensation of the noise and offset voltages is not required.

Briefly stated, these objects are attained in an electromagnetic flowmeter whose primary includes a flow tube through which the fluid to be metered is conducted to intersect a magnetic field and thereby induce a voltage therein that is transferred to electrodes to produce an electrode signal as a function of flow rate, which signal includes a noise voltage.

The electrode signal is applied to the input amplifier of a secondary whose output is fed to one input of a summing stage, the output of which is fed to a range amplifier that yields a test voltage, the input and range amplifiers producing offset voltages. To compensate for the noise and offset voltages, a compensation voltage is derived from the test voltage and applied to the other input of the summing stage. This compensation voltage is produced only when the test voltage exceeds a predetermined threshold value.

BRIEF DESCRIPTION OF DRAWINGS

For a better understanding of the invention as well as other objects and further features thereof, reference is made to the following detailed description to be read in conjunction with the accompanying drawings, wherein:

FIG. 1 is a block diagram of a first embodiment of a noise and offset voltage compensated electromagnetic flowmeter in accordance with the invention;

FIG. 2 (a to b) is a timing diagram of the signals produced in the first embodiment;

FIG. 3 is a block diagram of a second embodiment of the invention;

FIG. 4 (a to f) is a timing diagram of the signals produced in the second embodiment;

FIG. 5 is a block diagram of a third embodiment of the invention;

FIG. 6 is a timing diagram of the signals produced in the third embodiment; and

FIG. 7 is a block diagram of a fourth embodiment of the invention.

DESCRIPTION OF INVENTION

First Embodiment:

Referring now to FIG. 1, there is shown an electromagnetic flowmeter primary 1 in which the fluid whose flow rate is to be metered is conducted through a flow tube 2 provided with a pair of metering electrodes 3 and 4 at diametrically-opposed positions along an electrode axis perpendicular to the longitudinal flow axis of the tube. Disposed at diametrically-opposed positions along a field axis perpendicular both to the electrode axis and the flow axis are electromagnet coils 5 and 6. These generate a magnetic field whose lines of flux are intersected by the flowing liquid, as a consequence of which a signal voltage is induced therein which is transferred to the electrodes.

The signal voltage yielded by the primary is applied to the input amplifier 9 of a secondary whose output is an electrode signal voltage $U_E$ that includes a noise voltage component. Signal voltage $U_E$ is applied through a summing stage 10 to a range amplifier 11 that yields a measuring or test voltage $U_M$. This test voltage is applied to two sample and hold stages 12 and 13 which scan the test voltage to produce half-cycle scanning voltages $U_M+$ and $U_M-$.

Stage 12 includes an R-C network formed by resistor 12-1 and capacitor 12-2. Stage 13 includes an R-C network formed by resistor 13-1 and capacitor 13-2. Test voltage $U_M$ is entered into stage 12 by way of an electronic switch 12-3 actuated by a timing signal B, and it is also entered into stage 13 by way of an electronic switch 13-3 actuated by a timing signal C. These clocked timing signals are generated by a timer 8 which also generates timing signals A and A' which are applied to a control stage 7 for electromagnet coils 5 and 6.

The half-cycle scanning values are superimposed on a summing stage 14 whose output is applied to a signal processing system 15 which is controlled by a timing signal E from timer 8. Timing signal E controls a compensation interval in which there are no valid measurement values to signal processing system 15, and it can also simultaneously deliver information on the quality of the signal voltage.

In order to compensate for noise voltages generated in the primary of the flowmeter as well as for offset voltages arising in amplifier stages 9 and 11 of the secondary, a compensating voltage $U_K$ is derived from test voltage $U_M$. Compensating voltage $U_K$ is generated as a function of a predetermined threshold value as long as test voltage $U_M$ and the half-cycle scanning values $U_M+$ and $U_M-$ exceed this threshold.

To this end, values $U_M+$ and $U_M-$ appearing at terminals 18 and 19 are applied to a timer control stage 17 for timer 8. Control stage 17 yields at its output terminal 20 a control signal F that is applied to timer 8 only when two threshold values $U_U$ and $U_O$ are exceeded in both half cycles of scanning values $U_M+$ and $U_M-$. Timer 8, when activated by control signal F, delivers a timing signal D to a sample and hold stage 16 which yields the compensating voltage $U_K$.

Timer control stage 17 includes a pair of comparators 17-1 and 17-2 which respectively compare threshold values $U_U$ and $U_O$ with the half-cycle scanning values $U_M+$ and $U_M-$. The outputs of these comparators are applied to an OR gate 17-E which produces at its output terminal 20 the timer control signal F.

Essential to the invention is that compensation by compensating voltage $U_K$ take place during a correction interval only when the half-cycle scanning values $U_M+$ and $U_M-$ exceed threshold values $U_U$ and $U_O$. If during this correction interval, a change occurs in the noise or offset voltages, then the half-cycle scanning values are not fully compensated for to zero by the end of the interval. However, as a rule, the subsequent half-cycle scanning values $U_M+$ and $U_M-$ will lie well within the limits defined by threshold values $U_U$ and $U_O$. If this is not the case, a new correction interval will commence.

The timing relationship of timing signals A', A, B and C are illustrated in timing diagrams 2(a), 2(b), 2(c) and 2(d), respectively. FIG. 2(e) shows the timing relationship between threshold values $U_O$ and $U_U$ and the half-cycle values $U_M+$ and $U_M-$, while FIGS. 2(f), 2(g) and 2(h) illustrate the timing relationship of timing signals F, D and E.

It is to be noted that in FIG. 2(a), signal A' from timer 8 applied to coil control stage 7 (see FIG. 1) is operated when the magnetic field in the primary of the meter is not switched off and when the compensating voltage $U_K$ is then operative. Signal A in FIG. 2(b) is operative when the magnetic field is switched off and the compensating voltage $U_K$ is operative. In the flowmeter arrangement shown in FIG. 1, threshold values $U_U$ and $U_O$ can be constant or made variable to take into account expected noise signals in primary 1.

Second Embodiment:

FIG. 3 shows a modification of the flowmeter arrangement shown in FIG. 1. The parts in the FIG. 1 arrangement which remain unchanged are not shown in FIG. 3.

In the FIG. 3 embodiment, the half-cycle values $U_M+$ and $U_M-$ which appear at terminals 18 and 19 are applied to a summing stage 180 which add these values to produce at output terminal 190 an error voltage $U_F$ that depends on the half-cycle scanning values. Error voltage $U_F$ is applied to a timer control stage 170 responsive to a threshold value $U_G$.

Stage 170, which is similar to stage 17 in FIG. 1, includes a pair of comparators 170-1 and 170-2 whose outputs are applied to an OR gate 170-3 that yields signal F at terminal 20 to activate timer 8. Error voltage $U_F$ is fed directly into both comparators. Threshold voltage $U_G$ is fed directly into comparator 170-2 and via an inverter 170-4 into comparator 170-1.

The timing diagram for this embodiment is shown in FIG. 4 in which FIG. 4(a) shows timing signal B; FIG. 4(b), timing signal C; FIG. 4(c) threshold voltage $+U_G$ and $-U_G$; FIG. 4(d) timing signal F; FIG. 4(e), timing signal D; and FIG. 4(f) timing signal E.

Third Embodiment:

FIG. 5 is a modification that includes stages found in the FIG. 1 and FIG. 3 embodiments; hence these stages are not shown.

In the FIG. 5 embodiment, terminal 190 shown therein corresponds to the same terminal in FIG. 3 where an error voltage $U_F$ is yielded by summing stage 180. Error voltage $U_F$ is applied from terminal 190 to a timer control stage 170 to produce a signal F' that is applied to timer 8 which is arranged to also yield a timing signal G.

Timing signal G is fed to range amplifier 11 which yields test voltage $U_M$, and also to a sample and hold stage 160 responsive to error signal $U_F$. Stage 160 includes elements 160-1 to 160-4 corresponding to elements 16-1 to 16-4 in stage 16 in FIG. 1. Switch 160-4 of stage 160 is actuated by timing signal D' from timer 8.

In this embodiment, the amplification in the test voltage amplifier circuits and in the compensating voltage circuit can be adjusted to a given relationship with the noise and offset voltages via timing signal G. If there is a dividing factor which reduces the amplification in range amplifier and in sample and hold stage 160, an adjustment can be made in the noise and offset voltages which otherwise would lead in an overloading of the scanning and holding stages 12 and 13.

In this way, compensating voltage $U_K$ can be reduced by proper selection of the amplification. If the amplification of range amplifier 11 is reduced about the dividing factor, amplification about the dividing factor must be reduced in scanning and holding stage 160.

For example, if there is a substantial noise signal that causes overloading of scanning and holding stages 12 and 13, an error voltage $U_F$ of adequate amplitude will not appear at terminal 190 of summing stage 180. When, however, the amplification of range amplifier 11 is reduced, the sample and hold stages will no longer be overloaded. But since offset voltage $U_F$ at terminal 190 will be limited to the dividing factor, it must be again increased according to the dividing factor in sample and hold stage 160 so that the compensating voltage $U_K$ has the necessary amplitude after the correction interval.

Since in this embodiment, compensating voltage $U_K$ is subtracted directly from error voltage $U_F$, two cycles of the test signal are required for the correction interval, since the new measurement values must be taken care of in sample and hold stages 12 and 13 following an overload of the threshold value.

FIGS. 6(a) to 6(b) give the timing diagrams of the signals developed in the FIG. 5 embodiment.

Fourth Embodiment:

The embodiment in FIG. 7 is a modification of the embodiment in FIG. 5 and includes a stage 161 having a comparator 161-1, a switch 161-2 and an R-C network 161-4. The output of stage 160 at terminal 191 in FIG. 5 is applied to the + input of comparator 161-1. Stage 161 functions as a pulse-width modulator.

Timer 8 supplies to the − input of comparator 161-1 of stage 161 a sawtooth voltage H having a frequency which is high relative to the test voltage frequency. Comparator 161-1 compares signal H with signal $U_{St}$ from stage 160 (FIG. 5) to produce a pulse-width modulated compensating voltage $U_K$ which adjusts itself in such a way as a function of control voltage $U_{St}$ that the noise and offset voltages are compensated to zero. The timing diagram shown by FIGS. 6(a) to 6(b) are also applicable to this embodiment.

While there have been shown and described preferred embodiments of a noise and offset voltage-compensated electromagnetic flowmeter in accordance with the invention, it will be appreciated that many changes and modifications may be made therein without, however, departing from the essential spirit thereof.

We claim:

1. A flowmeter provided with a primary in which a fluid whose flow rate is to be metered is conducted through a flow tube to intersect a magnetic field established therein by electromagnet coils to induce a voltage therein that is transferred to electrodes to produce an electrode signal that depends on flow rate and includes a noise voltage, and a secondary operatively coupled to the primary, said secondary comprising:
   (a) an input amplifier responsive to the electrode signal from the primary;
   (b) a summing stage having two inputs, to one of which is applied the output of the input amplifier;
   (c) a range amplifier responsive to the output of the summing stage to produce a test signal voltage, said input and range amplifiers having offset voltages produced therein which together with the primary noise voltage disturb the accuracy of the flowmeter; and
   (d) means to derive from the test signal voltage a compensating voltage which is applied to the other input of a summing stage to effect compensation for said noise and offset voltages when the test signal voltages exceed a predetermined threshold value.

2. A flowmeter as set forth in claim 1, wherein said compensating voltage derived from the test signal voltage is produced by a sample and hold stage activated by a timing signal obtained from a timer activated by plus and minus half-cycle sample values of the test signal voltage which are compared with threshold values.

3. A flowmeter as set forth in claim 2, wherein said plus and minus half-cycle half cycle sampled values are produced by respective sample and hold stages coupled to the output of the range amplifier whose outputs are applied to a timer control stage.

4. A flowmeter as set forth in claim 3, wherein said compensating voltage is derived from an error voltage obtained by adding the half cycle sampled values, which error voltage is compared with a threshold value.

5. A flowmeter as set forth in claim 4, in which the compensating voltage is pulse-width modulated by a sawtooth voltage whose frequency is high relative to the frequency of the test signal voltage.

6. A flowmeter as set forth in claim 1, wherein the magnetic field produced in the primary is cut off when the compensating voltage is operative.

7. A flowmeter as set forth in claim 1, wherein the magnetic field produced in the primary remains operative when the compensating voltage is operative.

* * * * *